United States Patent
Bosshart

(10) Patent No.: US 11,811,902 B2
(45) Date of Patent: Nov. 7, 2023

(54) RESILIENT HASHING FOR FORWARDING PACKETS

(71) Applicant: Barefoot Networks, Inc., Santa Clara, CA (US)

(72) Inventor: Patrick Bosshart, Plano, TX (US)

(73) Assignee: Barefoot Networks, Inc., Santa Clara, CA (US)

( * ) Notice: Subject to any disclaimer, the term of this patent is extended or adjusted under 35 U.S.C. 154(b) by 209 days.

(21) Appl. No.: 17/152,658

(22) Filed: Jan. 19, 2021

(65) Prior Publication Data
US 2021/0194800 A1    Jun. 24, 2021

Related U.S. Application Data

(63) Continuation of application No. 16/378,491, filed on Apr. 8, 2019, now abandoned, which is a continuation of application No. 15/094,987, filed on Apr. 8, 2016, now Pat. No. 10,313,231.

(60) Provisional application No. 62/292,507, filed on Feb. 8, 2016.

(51) Int. Cl.
H04L 69/325   (2022.01)
H04L 45/44    (2022.01)
H04L 45/00    (2022.01)

(52) U.S. Cl.
CPC ............ *H04L 69/325* (2013.01); *H04L 45/38* (2013.01); *H04L 45/44* (2013.01); *H04L 45/54* (2013.01)

(58) Field of Classification Search
None
See application file for complete search history.

(56) References Cited

U.S. PATENT DOCUMENTS

| | | | | |
|---|---|---|---|---|
| 4,490,785 A | * | 12/1984 | Strecker | G06F 13/4022 710/100 |
| 5,068,892 A | * | 11/1991 | Livanos | H04M 3/36 379/112.01 |
| 5,757,795 A | | 5/1998 | Schnell | |
| 5,987,521 A | * | 11/1999 | Arrowood | H04L 45/42 709/239 |
| 7,110,404 B1 | | 9/2006 | Temoshenko | |

(Continued)

OTHER PUBLICATIONS

First Office Action for U.S. Appl. No. 17/346,035, dated Aug. 23, 2022, 11 pages.

(Continued)

*Primary Examiner* — Christopher T Wyllie
(74) *Attorney, Agent, or Firm* — Essential Patents Group, LLP; Christopher K. Gagne

(57) ABSTRACT

A method of identifying a path for forwarding a packet by a packet forwarding element. The method receives a packet that includes a plurality of fields that identify a particular packet flow. The method computes a plurality of hash values from the plurality of fields that identify the particular packet flow. Each hash value computed using a different hash algorithm. Based on the plurality of hash values, the method identifies a plurality of paths configured to forward the packets of the particular flow. The method identifies the status of each of the plurality of paths. Each path status identifies whether or not the corresponding path is operational. The method selects an operational path in the plurality of paths to forward the packet based on a priority scheme using said plurality of identified status bits.

16 Claims, 13 Drawing Sheets

(56) References Cited

U.S. PATENT DOCUMENTS

| | | | |
|---|---|---|---|
| 7,120,834 B1 | 10/2006 | Bishara | |
| 7,190,696 B1* | 3/2007 | Manur | H04L 45/38 |
| | | | 370/392 |
| 7,664,873 B1* | 2/2010 | Ghosh | H04L 41/14 |
| | | | 709/224 |
| 7,953,089 B1 | 5/2011 | Ramakrishnan et al. | |
| 8,553,582 B1 | 10/2013 | Mizrahi et al. | |
| 8,743,704 B2* | 6/2014 | Nishi | H04L 43/091 |
| | | | 370/242 |
| 8,942,085 B1* | 1/2015 | Pani | H04L 45/28 |
| | | | 370/225 |
| 9,319,347 B1 | 4/2016 | Sindhu et al. | |
| 9,559,985 B1 | 1/2017 | Ye et al. | |
| 9,565,114 B1* | 2/2017 | Kabbani | H04L 45/7453 |
| 9,571,400 B1* | 2/2017 | Mandal | H04L 47/125 |
| 9,608,913 B1 | 3/2017 | Kabbani et al. | |
| 9,680,749 B2* | 6/2017 | Labonte | H04L 45/586 |
| 9,860,081 B2 | 1/2018 | Keesara et al. | |
| 9,876,719 B2* | 1/2018 | Revah | H04L 45/7453 |
| 10,063,407 B1 | 8/2018 | Kodeboyina et al. | |
| 10,237,206 B1 | 3/2019 | Agrawal et al. | |
| 10,313,231 B1 | 6/2019 | Bosshart | |
| 10,404,619 B1 | 9/2019 | Agrawal et al. | |
| 10,728,173 B1 | 7/2020 | Agrawal et al. | |
| 2001/0042130 A1* | 11/2001 | Brown | H04L 45/54 |
| | | | 709/238 |
| 2002/0141403 A1* | 10/2002 | Akahane | H04L 47/2441 |
| | | | 370/389 |
| 2002/0159466 A1* | 10/2002 | Rhoades | H04L 45/742 |
| | | | 370/408 |
| 2003/0204631 A1* | 10/2003 | Pinkerton | H04L 69/166 |
| | | | 709/249 |
| 2004/0091104 A1* | 5/2004 | Kawamura | H04L 63/0457 |
| | | | 380/28 |
| 2004/0213224 A1* | 10/2004 | Goudreau | H04L 9/40 |
| | | | 370/389 |
| 2004/0235480 A1* | 11/2004 | Rezaaifar | H04L 45/24 |
| | | | 455/445 |
| 2005/0078601 A1* | 4/2005 | Moll | H04L 45/745 |
| | | | 370/218 |
| 2005/0147095 A1 | 7/2005 | Guerrero et al. | |
| 2006/0045088 A1* | 3/2006 | Nguyen | H04L 45/74591 |
| | | | 370/392 |
| 2006/0232447 A1* | 10/2006 | Walker | H04W 52/0245 |
| | | | 341/50 |
| 2006/0245361 A1* | 11/2006 | Cheethirala | H04L 47/10 |
| | | | 370/389 |
| 2007/0047453 A1* | 3/2007 | Bender | H04L 41/06 |
| | | | 370/244 |
| 2007/0053283 A1* | 3/2007 | Bidwell | H04L 43/0817 |
| | | | 370/242 |
| 2007/0086364 A1* | 4/2007 | Ellis | H04L 12/46 |
| | | | 370/258 |
| 2007/0177594 A1 | 8/2007 | Kompella | |
| 2007/0250713 A1* | 10/2007 | Rahman | H04W 12/50 |
| | | | 713/171 |
| 2008/0114892 A1* | 5/2008 | Bruno | H04L 47/125 |
| | | | 709/234 |
| 2008/0151890 A1 | 6/2008 | Zelig et al. | |
| 2009/0307241 A1* | 12/2009 | Schimunek | G06F 16/9014 |
| 2010/0020680 A1 | 1/2010 | Salam et al. | |
| 2012/0020206 A1 | 1/2012 | Busi et al. | |
| 2013/0028072 A1 | 1/2013 | Addanki | |
| 2013/0083660 A1 | 4/2013 | Rajagopalan et al. | |
| 2013/0177016 A1 | 7/2013 | Nakano et al. | |
| 2013/0279504 A1 | 10/2013 | Gulati et al. | |
| 2013/0318297 A1* | 11/2013 | Jibbe | G06F 11/2005 |
| | | | 711/E12.001 |
| 2013/0322231 A1 | 12/2013 | Császár et al. | |
| 2013/0322232 A1 | 12/2013 | Császár et al. | |
| 2013/0322457 A1 | 12/2013 | Budhia et al. | |
| 2014/0040477 A1* | 2/2014 | King | H04L 67/1034 |
| | | | 709/226 |
| 2014/0313885 A1* | 10/2014 | Wen | H04L 45/18 |
| | | | 370/328 |
| 2015/0055652 A1 | 2/2015 | Yong et al. | |
| 2015/0127701 A1 | 5/2015 | Chu et al. | |
| 2015/0295818 A1 | 10/2015 | Hayashitani et al. | |
| 2015/0312135 A1 | 10/2015 | Velayudhan et al. | |
| 2016/0142220 A1 | 5/2016 | Hao et al. | |
| 2016/0142315 A1 | 5/2016 | Tomonaga et al. | |
| 2016/0154756 A1* | 6/2016 | Dodson | G06F 13/4022 |
| | | | 710/316 |
| 2016/0191361 A1 | 6/2016 | Behera et al. | |
| 2017/0201942 A1* | 7/2017 | Mathews | H04M 1/72412 |
| 2017/0288947 A1* | 10/2017 | Kaniampady Sebastian | H04L 45/22 |
| 2017/0295500 A1* | 10/2017 | Sun | H04B 7/0456 |
| 2017/0302504 A1 | 10/2017 | Wang et al. | |
| 2019/0159071 A1* | 5/2019 | Yavuz | H04W 80/08 |
| 2021/0194800 A1* | 6/2021 | Bosshart | H04L 69/325 |

OTHER PUBLICATIONS

"L2 EtherChannel Load Balancing", Cisco Community, https://www.cisco.com/c/en/us/support/docs/lan-switching/etherchannel/12023-4.html, Jun. 30, 2015, 11 pages.

Advisory Action for U.S. Appl. No. 15/094,987, dated Sep. 6, 2018, 4 pages.

Ahmadi, Mahmood, et al., "Hashing Functions Performance in Packet Classification", Computer Engineering Laboratory, Delft University of Technology, Jan. 2007, 6 pages.

Eisenbud, Daniel E., et al., "Maglev: a Fast and Reliable Software Network Load Balancer," 13th USENIX Symposium on Networked Systems Design and Implementation Mar. 16, 2016, 13 pages, USENIX Association, Santa Clara, CA, USA.

Fan, Bin, et al., "Small Cache, Big Effect: Provable Load Balancing for Randomly Partitioned Cluster Services," SOCC'11, 2nd ACM Symposium on Cloud computing, Oct. 27-28, 2011, 12 pages, ACM, Cascais, Portugal.

Final Office Action for U.S. Appl. No. 15/094,987, dated Apr. 4, 2018, 13 pages.

Final Office Action for U.S. Appl. No. 16/048,202, dated Apr. 30, 2020, 22 pages.

Final Office Action for U.S. Appl. No. 16/378,491, dated Sep. 17, 2020, 12 pages.

First Office Action for U.S. Appl. No. 15/094,987, dated Sep. 21, 2017, 16 pages.

First Office Action for U.S. Appl. No. 15/150,015, dated Dec. 29, 2017, 16 pages.

First Office Action for U.S. Appl. No. 16/048,202, dated Sep. 26, 2019, 21 pages.

First Office Action for U.S. Appl. No. 16/271,624, dated Oct. 31, 2019, 26 pages.

First Office Action for U.S. Appl. No. 16/378,491, dated Feb. 21, 2020, 13 pages.

First Office Action for U.S. Appl. No. 16/548,833, dated Dec. 9, 2020, 14 pages.

Non-Published commonly owned U.S. Appl. No. 15/094,987, filed Apr. 8, 2016, 43 pages, Barefoot Networks, Inc.

Non-Published commonly owned U.S. Appl. No. 15/150,015, filed May 9, 2016, 51 pages, Barefoot Networks, Inc.

Non-Published commonly owned U.S. Appl. No. 15/449,969, filed Mar. 5, 2017, 57 pages, Barefoot Networks, Inc.

Non-Published commonly owned U.S. Appl. No. 15/449,974, filed Mar. 5, 2017, 56 pages, Barefoot Networks, Inc.

Non-Published commonly Owned U.S. Appl. No. 16/048,202, filed Jul. 27, 2018, 49 pages, Barefoot Networks, Inc.

Non-Published commonly owned U.S. Appl. No. 16/271,624, filed Feb. 8, 2019, 65 pages, Barefoot Networks, Inc.

Non-Published Commonly Owned U.S. Appl. No. 16/378,491, filed Apr. 8, 2019, 43 pages, Barefoot Networks, Inc.

Non-Published commonly owned U.S. Appl. No. 16/548,833, filed Aug. 22, 2019, 42 pages, Barefoot Networks, Inc.

Notice of Allowance for U.S. Appl. No. 16/271,624, dated Mar. 17, 2020, 13 pages.

(56) References Cited

OTHER PUBLICATIONS

Shantharama, Prateek, et al., "Hardware-Accelerated Platforms and Infrastructures for Network Functions: a Survey of Enabling Technologies and Research Studies". IEEEAccess, Jul. 29, 2020, 65 pages.

First Office Action for U.S. Appl. No. 16/903,305, dated Mar. 24, 2021, 17 pages.

* cited by examiner

RESILIENT HASHING FOR FORWARDING PACKETS

CLAIM OF BENEFIT TO PRIOR APPLICATIONS

The present Application is a continuation of U.S. patent application Ser. No. 16/378,491, filed Apr. 8, 2019, which is a continuation of U.S. patent application Ser. No. 15/094,987, filed Apr. 8, 2016, which claims the benefit of U.S. Provisional Application 62/292,507, entitled "Resilient Hashing for Forwarding Packets," filed Feb. 8, 2016. The contents of U.S. Provisional Application 62/292,507 and U.S. patent application Ser. Nos. 15/094,987 and 16/378,491 are hereby incorporated by reference.

BACKGROUND

A forwarding element such as a switch or a router can often send packets to a destination through several different egress paths. The forwarding elements utilize different algorithms to identify the best path to send the packets to optimize network congestion as well as transmission time.

In addition, the forwarding elements forward the packets of the same flow through the same path as long as that path is up in order to achieve one or more goals such as traffic shaping, quality of service, fair queuing, etc. However, a path used to forward packets of a flow may fail. For instance, the path may fail due to a port or a wire failure inside the forwarding element or due to a path failure several hops away between the forwarding element and a packet destination.

Once one of these egress paths fails, the forwarding element has to select an alternative path to forward the packets in order to avoid forwarding packets on the failed path. An alternative path is typically determined by removing the failed path from the set of paths to consider, applying the path determination algorithm to the remaining paths to redistribute packet flows through the remaining paths. However, redistribution of packet flows from the paths that did not go down in order to accommodate a failed path is not desirable since such redistribution is contrary to the above-mentioned goals of forwarding the packet of the same flows through the same paths.

BRIEF SUMMARY

Some embodiments provide a resilient hashing technique for forwarding packets in a communication network. The hashing technique in some embodiments is utilized by a forwarding element such as a network switch or router to forward packets of a flow to their destination. A packet flow is a sequence of packets from a source to a destination within a certain time period. A set of fields of each packet uniquely identifies the corresponding packet flow. For instance, a set of packet fields such as the L3 source and destination addresses (e.g., IP source and IP destination addresses), the L4 source and destination ports (e.g., TCP or UDP source and destination ports), and the L4 protocol used (e.g., TCP or UDP) may identify a packet flow in some embodiments.

In some embodiments, the forwarding element can forward a packet to its destination through one of several egress paths. It is desirable to forward the packets of the same flow through the same path as long as that path is up in order to achieve one or more goals such as traffic shaping, quality of service, fair queuing, etc. The set of fields that uniquely identifies the packet flow in each packet is hashed and each packet flow is assigned to one of the egress paths based on the hashed value. When an egress path fails, the resilient hashing technique only redistributes packet flows that were assigned to the failed path without redistributing packet flows that were previously assigned to the operational paths.

If resilient hashing fails to identify an operational path, some embodiments utilize a deterministic method to identify a path for redistributing the flows from a failed path. Once such a path is identified, the path is used to forward packets of the same flow. Similar to the resilient hashing technique, the deterministic method only redistributes packet flows that were assigned to the failed paths without redistributing packet flows that were previously assigned to the operational paths The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing. In a forwarding element (e.g., a hardware switch or a hardware router), the data plane is the part of the architecture that decides what to do with the packets that arrive at the ingress interface. The data plane of a forwarding element is implemented by hardware and firmware while the control plane is implemented in software to provide for a more flexible management of network components from a central location.

A packet flow is a sequence of packets sent from a source to a destination within a certain time period. A forwarding element can usually forward a packet to its destination through one of several egress paths with the same or similar costs. It is desirable to forward the packets of the same flow through the same path as long as that path is up in order to achieve one or more goals such as traffic shaping, quality of service, fair queuing, etc.

Figure 1:
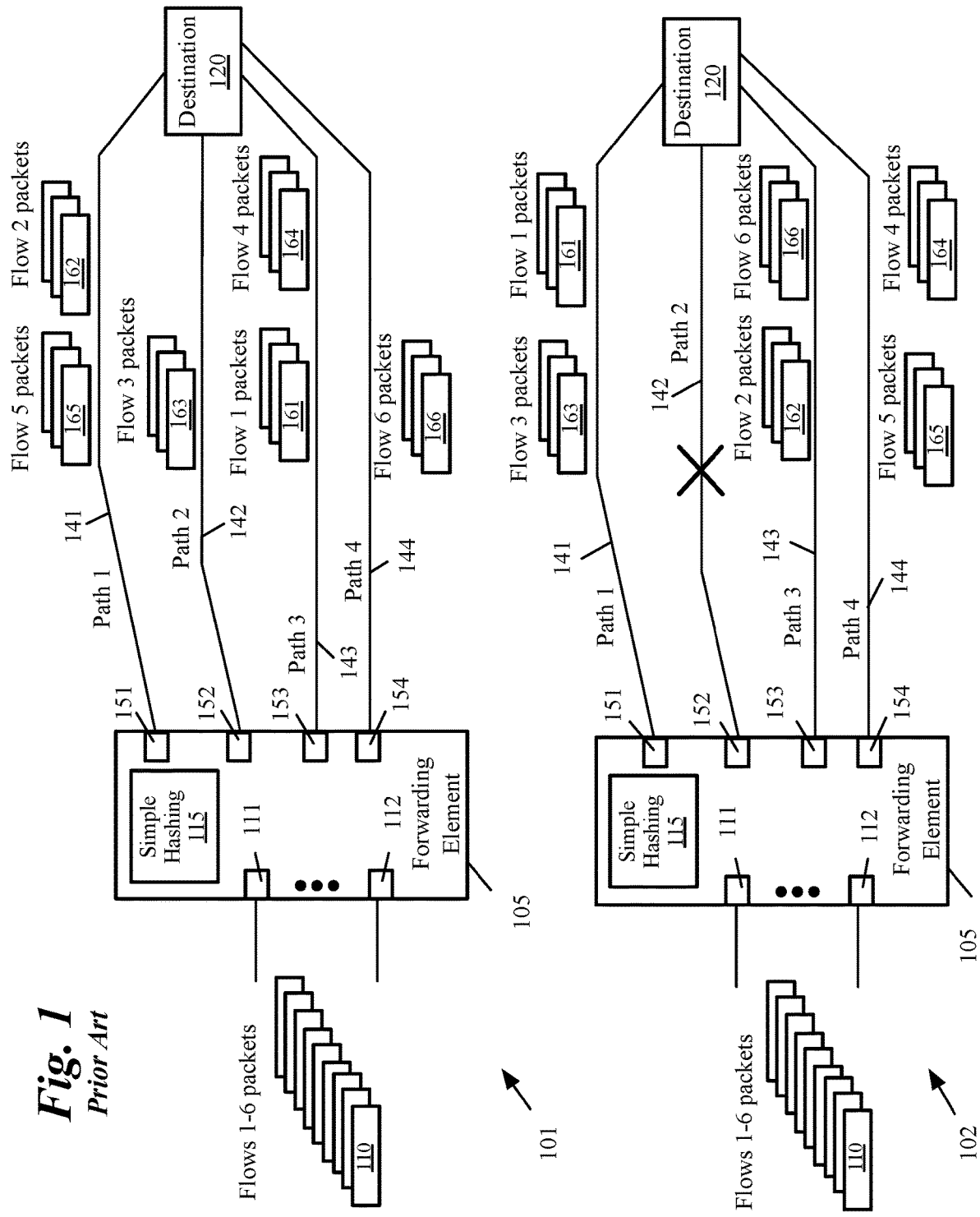
FIG. 1 illustrates a forwarding element that forwards packets according to prior art.

FIG. 1 illustrates a forwarding element that forwards packets according to prior art. The figure is shown in two stages 101 and 102. In stage 101, the forwarding element 105 receives incoming packets 110 through several ingress ports 111-112. In this example, the packets belong to six flows, Flow 1 through Flow 6. In practice, a forwarding element may handle hundreds of thousands of active flows at each time.

Each packet 110 has a set of fields (e.g., an n tuple in the packet header) that uniquely identifies the packet's flow. The forwarding element has a simple hashing module 115 that hashes this set of fields using software to compute a hash value. Based on the calculated hash value for each flow (e.g., by calculating the modulo of the hash value and the number of available paths), one of the available egress paths from the forwarding element to the packet destination is selected to forward the packets of each flow. Since packets of the same flows carry the same n tuple in their header, all packets of the same flow are forwarded through the same path to their destination device 120 as long as that path remains operational.

In this example, there are four paths 141-144 that are determined to have equal costs and can be used to forward the packets from forwarding element 105 to the destination 120. For instance, "path 1" 141 goes from egress port 151 of the forwarding element 105 possibly through one or more intermediate network devices (not shown) to the destination device 120. In practice, there could be many intermediate network nodes (or hops) between the forwarding element 105 and the destination device 120. For simplicity, these intermediate nodes (or network devices) are not shown in the figure. Similarly, "path 2" 142 goes from egress port 152 through one or more intermediate network devices (not shown) to the destination device 120; "path 3" 143 goes from egress port 153 through one or more intermediate network devices (not shown) to the destination device 120; and "path 4" 144 goes from egress port 154 through one or more intermediate network devices (not shown) to the destination device 120.

As shown in the example of FIG. 1, packets 165 of Flow 5 and packets 162 of Flow 2 are forwarded through "path 1" 141; packets 163 of Flow 3 are forwarded through "path 2" 142; packets 161 of Flow 1 and packets 164 of Flow 4 are forwarded through "path 3" 143; and packets 166 of Flow 6 are forwarded through "path 4" 146.

In step 102, path 2 142 goes down. For example a wire is cut or an intermediate hop (not shown) between forwarding element 105 and destination device 120 goes offline. As a result the incoming packets 110 for Flows 1-6 has to be forwarded through the remaining three paths. The simple hashing module redistributes the packet flows by calculating the modulo of the hash value and the number of available paths (which is now three).

As shown, the packets 161-166 of Flows 1 to 6 are redistributed to different paths. For instance, even though "path 4" 144 did not go down, packets 166 of Flow 6 that were going through this path in stage 101 are now going through "path 3" 143. However, redistributing of packet flows on the paths that did not go down is not desirable for the reasons described above.

I. Forwarding Flows from Failed Paths to Other Paths without Redistribution of Packet Flows from Operational Paths Some embodiments provide a hardware forwarding element that performs packet forwarding operations in the data path and only redistributes the packet flows on the failed paths without redistributing packet flows that were going through the operational paths. A packet flow is identified from a set of fields of a packet. The packets of the same flow are forwarded to the same path.

If a path goes down, some embodiments make several attempts to find an alternative operational path using a resilient hashing mechanism. If these attempts fail to find an operational path, then a deterministic method is used to identify an operational path. Once a path is determined through this deterministic method, all subsequent packets for the same flow are forwarded through that path.

A. Using Resilient Hashing to Find an Alternative Path to Forward Packets

Figure 2:
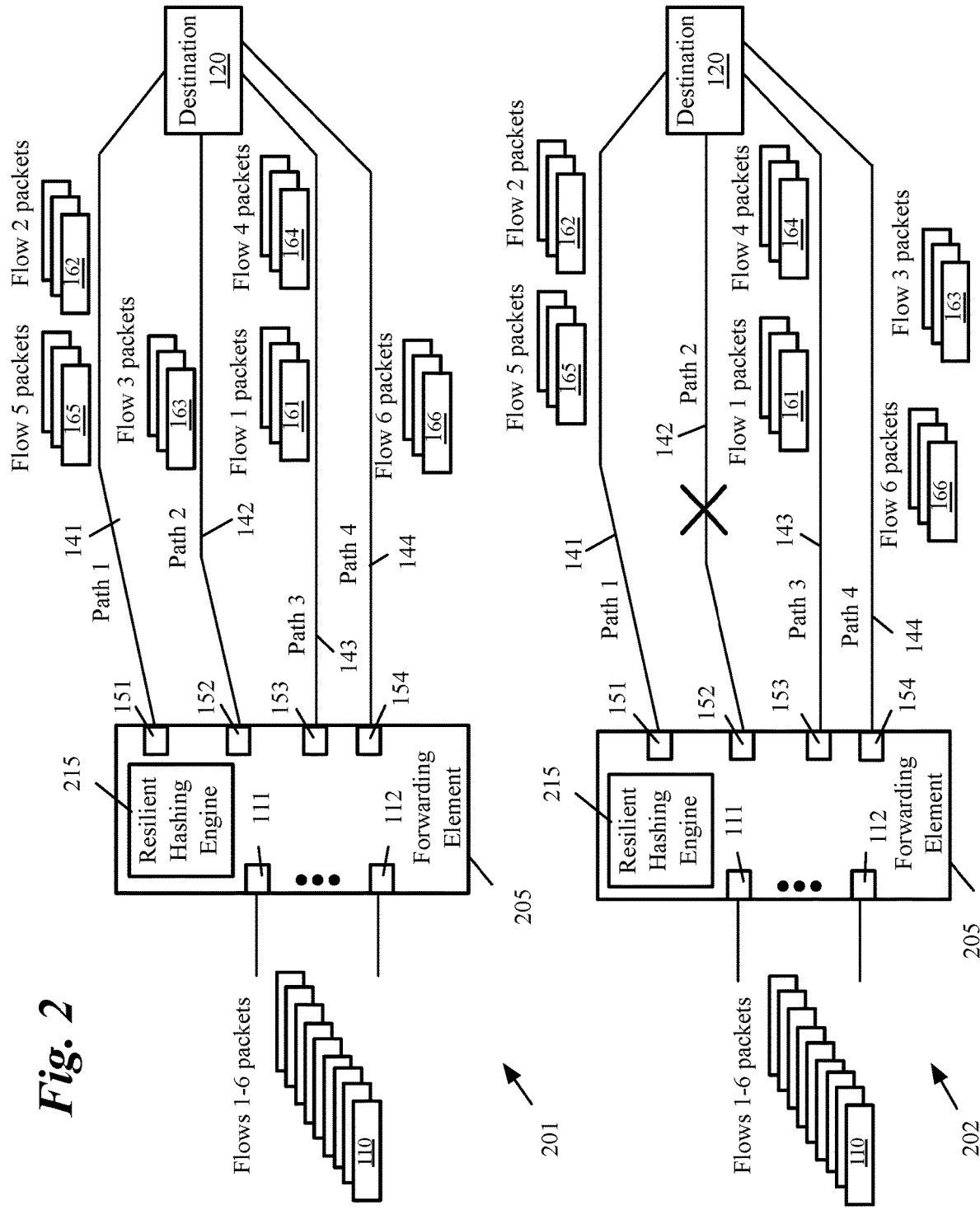
FIG. 2 conceptually illustrates a forwarding element that forwards packets in some embodiments.

FIG. 2 conceptually illustrates a forwarding element that forwards packets in some embodiments. The figure is shown in two stages 201 and 202. In stage 201, the forwarding element 205 receives incoming packets 110 through several ingress ports 111-112. Similar to the example of FIG. 1, the packets in FIG. 2 also belong to six flows, Flow 1 through Flow 6.

For each incoming packet 110, a resilient hashing engine 215 calculates a hash value of the n tuple that identifies the flow. The hash value modulo the number of available paths is used to select a path for the packets of each flow. As shown in stage 201, the packets 161-166 of Flows 1-6 are assigned to the same paths as shown in stage 101 in FIG. 1.

In stage 201, "path 2" 142 goes down. However, the resilient hashing engine 215 only redistributes packet 163 of Flow 3 that used to go through the failed "path 2". As shown, packets 163 of Flow 3 are redistributed to "path 4" 144. However, packets of other flows are still forwarded through the same paths as in stage 201. Different embodiments of forwarding element 205 and resilient hashing engine 215 are described further below.

Figure 3:
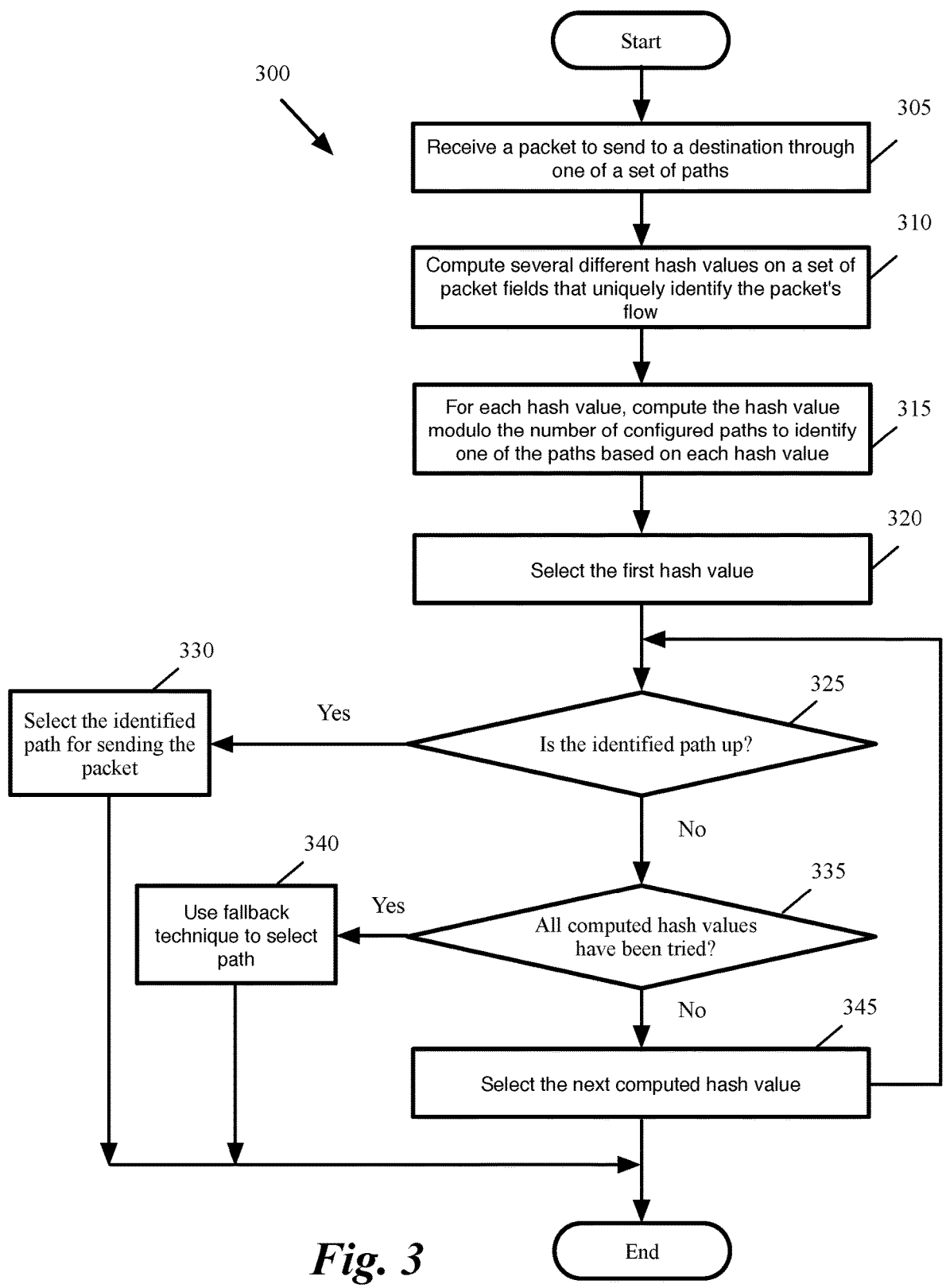
FIG. 3 conceptually illustrates a process for identifying a path to forward a packet to a destination in some embodiment.

Some embodiments provide a resilient hashing mechanism to redistribute flows from failed paths without redistributing flows that go through operational paths. FIG. 3 conceptually illustrates a process 300 for identifying a path to forward a packet to a destination in some embodiment. The process in some embodiments is performed by a resilient hashing engine such as the resilient hashing engine 215 in FIG. 2. In some embodiments, the resilient hashing engine is implemented by hardware and firmware in the data plane of a forwarding element. As shown, the process receives (at 305) an incoming packet to send to a destination through one of a set of paths. In some embodiments, several paths may be configured to forward packets from a forwarding element to a destination.

The process computes (at 310) a group of several different hash values on a set of packet fields. The packet fields are selected from a group of packet header fields that uniquely identifies a flow. For instance, some embodiments select an n tuple that includes the Open Systems Interconnection (OSI) model Layer 3 (L3) source and destination addresses (e.g., IP source and IP destination addresses), the OSI Layer 4 (L4) source and destination ports (e.g., TCP or UDP source and destination ports), and the L4 protocol used (e.g., TCP or UDP). Furthermore, each hash value in the group of hash values is computed on the same n tuple of the packet by using a different hash function in order to get different hash values from each hash function for the same n tuple.

For each computed hash value, the process then computes (at 315) the hash value modulo the number of configured paths to identify one of the configured paths based on each computed hash value. The process then selects (at 320) the first hash value from the group of hash values. The process then determines (at 325) whether the identified path is up. For instance, some embodiments assign a status flag (such as a bit in a set of one or more words) to each configured path. A certain value (e.g., 1) of the status flag would indicate that the corresponding path is up. Another value (e.g., 0) would indicate that the corresponding path is down.

When the process determines that the identified path is up, the process selects (at 330) the identified path for sending the packet. The process then ends. Otherwise, the process determines (at 335) whether all computed hash values have been tried. If yes, the process uses (at 340) a fallback technique to deterministically select a path. The process then ends.

When the process determines that all computed hash values have not been tried, the process selects (at 345) the next computed hash value. The process then proceeds to 325, which was described above. Operations of process 300 in some embodiments is implemented by hardware and firmware in the data plane of a forwarding element. In some of these embodiments, computation of the hash values may be performed in parallel. Similarly, computation of the modulo values may be performed in parallel. Also, selection of an operational path may be performed in parallel. Further details of different operations of process 300 are described below.

Figure 4:
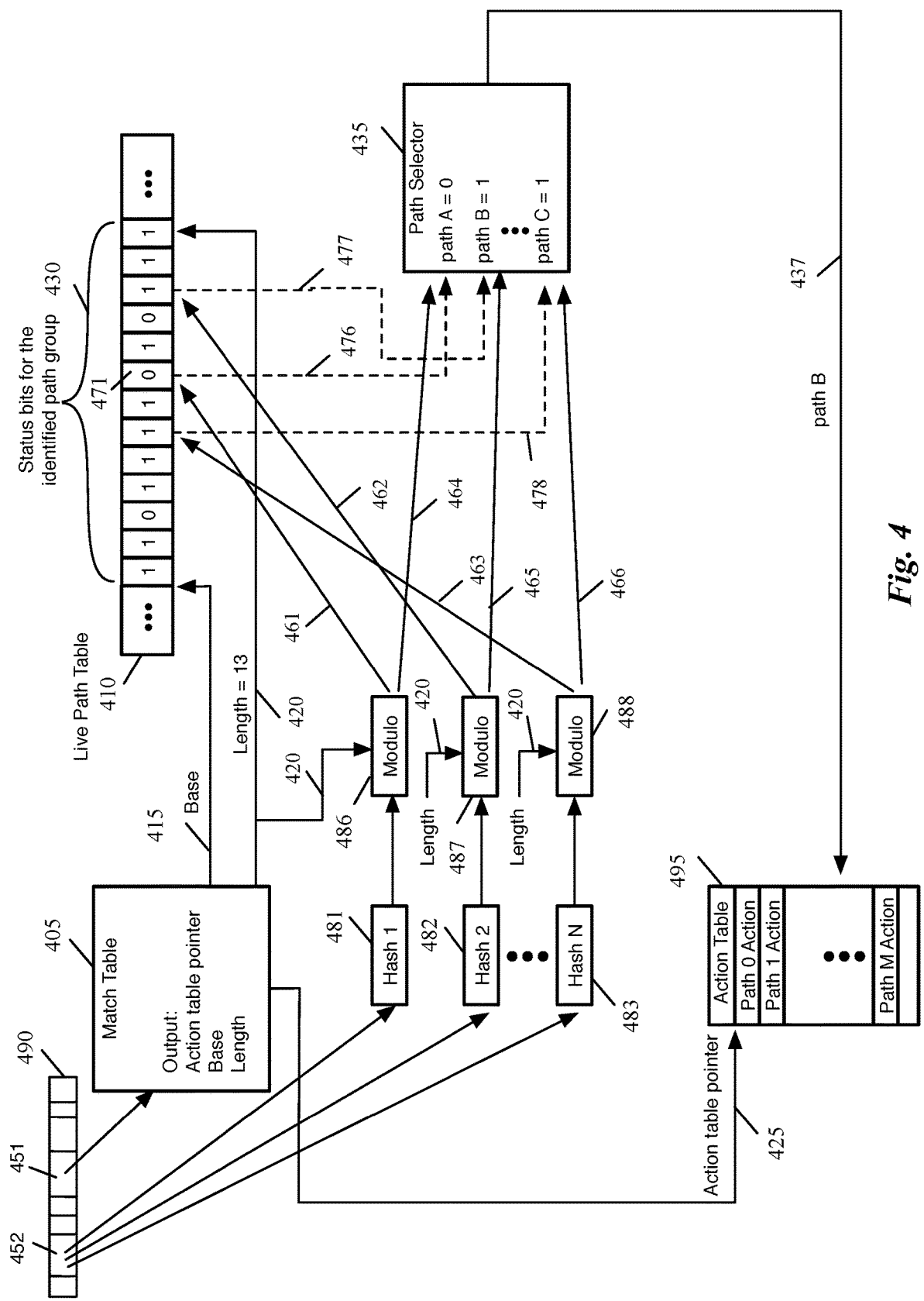
FIG. 4 conceptually illustrates a block diagram of a system for determining a path for forwarding a packet in some embodiments.

FIG. 4 conceptually illustrates a block diagram of a system for determining a path for forwarding a packet in some embodiments. The system in some embodiments is a forwarding element that implements process 300 described above. As shown, for each incoming packet 490 (e.g., for packets 110 in FIG. 3) a set of fields 451 is used to identify a group of paths that is used for forwarding the packet. For instance, some embodiments utilize the L3 destination address of the packet as an index to the match table 405 to identify the path group used for forwarding the packets to that destination.

The index is used to identify a set of information (i.e., action table pointer 425, base 415, and length 420) for the path group. Some embodiments hash the set of fields 451 (e.g., the L3 destination address of the packet) in order to quickly identify the corresponding information for the group of paths. In other embodiments, a set of other fields in a packet header is used to index into match table 405 to find the information for the group of paths that can be used to forward the packet to its destination. For instance, in some embodiments the path group identification is included in a pre-determined header field of each packet. These embodiments utilize the group identification to index in a match table 405 in order to identify the path group used for forwarding the packets to that destination.

As shown, a live path (or path representation) table 410 is used to keep track of weather each configured path in a path group is up or down. The table is conceptually shown to keep a set of status flags, one for each configured path. The status flag (e.g., a bit) corresponding to each configured path is used to show whether the path is up or down. A certain value (e.g., 1) for a status bit indicates that the corresponding path is up. Another value (e.g., 0) indicates that the corresponding path is down.

In addition, the status bits for each path group are kept in a sequence. The base 415 for each path group points to the beginning of the sequence of status bits for the group and the length 420 indicates how many paths are configured for the group. For instance, in the example of FIG. 4, base 415 is pointing to the beginning of the status bits 430 for the identified path group and the length 420 indicates that there are 13 paths configured for this group.

Once the path group for the packet 490 is identified, the hash of a set of fields 452 (e.g., the n tuple discussed above by reference to FIG. 3) is used to identify a path in the path group 430 for forwarding the packet. Several attempts are made to identify an operational path in the path group (i.e., a path that is up as indicated by the path's corresponding status bit). Although these attempts are conceptually described herein as sequential attempts, as described below all or portions of the decision to identify an operational path is performed by hardware and firmware in parallel.

In the first attempt, a hash function 481 is used to hash the n tuple 452 of the packet 490 to identify a path. The hash value generated by the hash function may be much larger than the number of available paths. For instance, if the hash function generates a 14 bit results, the hash value can be much larger than the 13 available paths in this example. A modulo operation 486 is therefore performed by dividing the hash value by the length 420 (which is the number of configured paths in the path group) and using the remainder as an index (as shown by arrow 461) to identify a path in the live path table 410.

If the status bit 471 associated with the identified path indicates that the path is up, the path is selected for forwarding the packet. However, if the identified path is down (as indicated by the value of 0 of the status bit 471 in the example of FIG. 4), several more attempts are made to identify a path in the path group 430 that is up.

As shown, in addition to the hash function 481, several other hash functions 482-483 are used to compute hash values for the packet n tuple 452. Each of the hash functions uses a different hash function in order to calculate different hash values for the same n tuple 452. Some embodiments perform additional operations to ensure that hash functions 481-483 generate different hash values (e.g., each hash in some embodiments is non-linearly S-box scrambled twice).

In the example of FIG. 4, the hash value generated by hash function 482 and modulo function 487 identifies a path (as shown by arrow 462) that is up (the status bit corresponding to the path is 1). Similarly, the hash value generated by hash function 483 and modulo function 488 also identifies a path (as shown by arrow 463) that is up.

The values of the status bits of the identified paths are input (as shown by arrows 476-478) into path selector 435. The path selector selects a path that is up using a predetermined priority. For instance, when the path identified by modulo function 486 is up, the path selector 435 selects that path for forwarding the packet. Otherwise, if the path identified by modulo function 487 is up, the path selector 435 selects that path for forwarding the packet, and so on. When none of the identified paths are up, a fallback technique is used to deterministically identify an operational path as described, below.

In the example of FIG. 4, both paths identified by modulo functions 487 and 488 are up (as shown by the value of 1 of the corresponding status bits). The path selector gives a higher priority to the path selected by modulo function 487 and that path is selected for forwarding the packet.

As shown, the path selector 435 also receives the results of modulo calculations (as shown by arrows 464-466). The path selector utilizes the modulo value used in selecting the path to calculate an index 437. The action table pointer 425 points to an action table 495 that stores identification (e.g., the next hop address or another identification) of the configured paths. For instance, the action table pointer points to a location in the table where the path addresses for the path group identified from match table are stored. The index 437 is used to identify the address of the path that is selected by the path selector 435 (in this example path B which was identified by modulo function 487).

Figure 5:
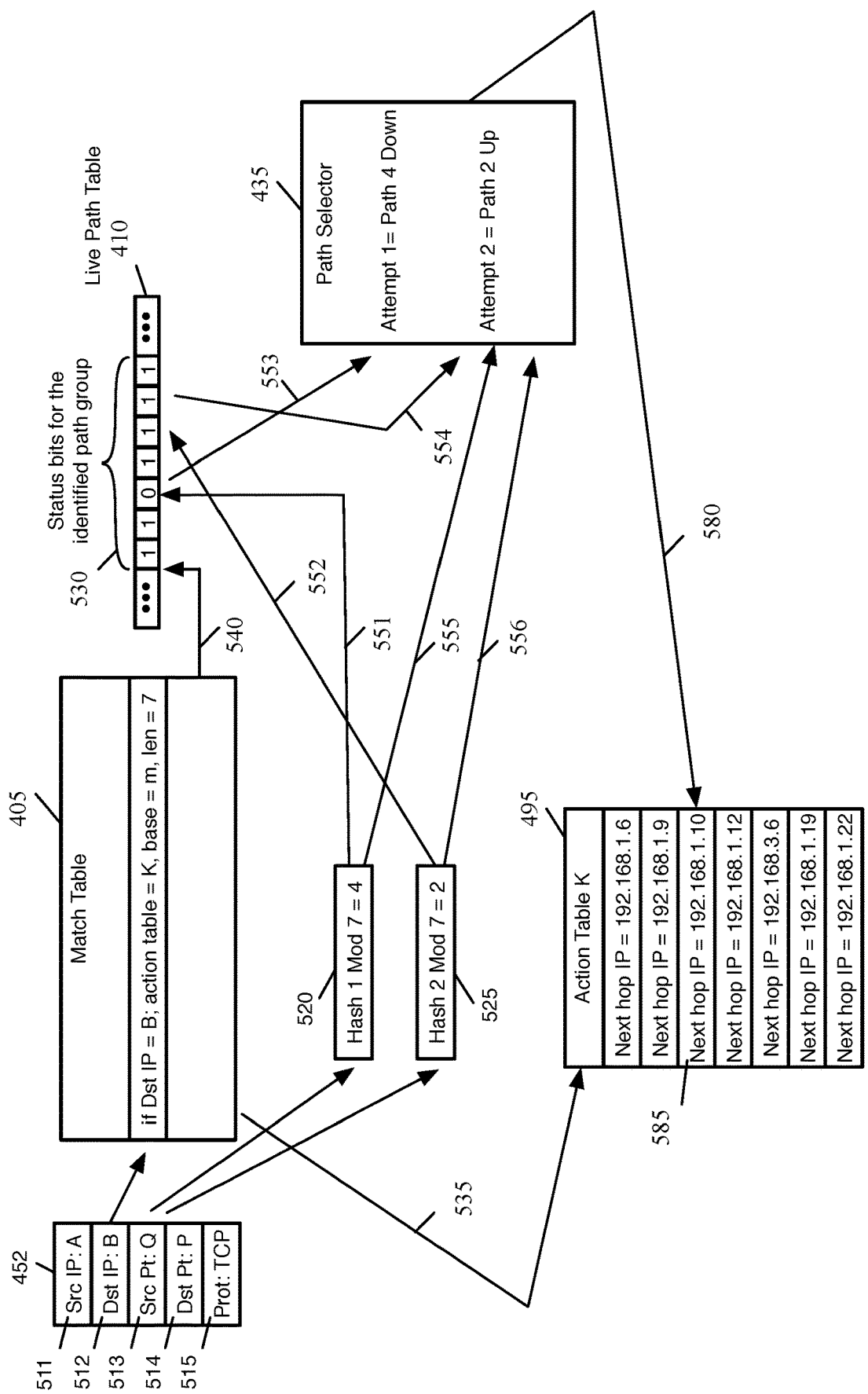
FIG. 5 conceptually illustrates an example of how a path is selected by the system of FIG. 4.

FIG. 5 conceptually illustrates an example of how a path is selected by the system of FIG. 4. For simplicity, the example of FIG. 5 uses only two hash functions. The set of fields 452 includes L3 source address 511 and L3 destination address 512 (e.g., IP source and IP destination addresses), L4 source port 513 and L4 destination port 514 (e.g., TCP or UDP source and destination ports), and L4 protocol 515 used (e.g., TCP or UDP).

As shown, the destination L3 destination address 512 of a packet is used as an index to find the information for the path group that is used to forward packets from the forwarding element to the destination represented by the L3 destination address 512.

In this example, for the destination IP address of "B", the action table is identified as table K, the base to locate the path group status bits 530 in the live path table 140 is "m", and the length (i.e., the number of configured paths in the path group) is 7. The action table K is identified by a pointer 535. The base 540 of the sequence of the status bits for the path group identifies where the status bits for the path group are located in the live path table 410. The length in this example indicates that there are 7 configured paths in the path group.

The n tuple 452 is hashed by each hash function and modulo 7 of the hash value is calculated. In this example, hash 1 modulo 7 has resulted a value of 4 (as shown by 520) and hash 2 modulo 7 is resulted in a value of 2 (as shown by 525). The value of 4 is used (as shown by arrow 551) as an index to locate the status bit of the 5$^{th}$ path in the path group (assuming that the index to the first path is 0 and the paths are indexed from right to left). As shown, the status bit is 0, which indicates that the path is down.

The value of 2 is also used (as shown by arrow 552) as an index to locate the status bit of the 3$^{rd}$ path in the path group. As shown, the status bit is 1, which indicates that the path is up. The path selector 435 receives the bit values (as shown by arrows 553 and 554) as input. Since the higher priority attempt (the result of hash 1 modulo length) has identified a path that is down, the path selector uses the result of hash 2 modulo length that has identified an operational path and selects path 2 as the path to forward the packet to its destination.

The path selector 435 also receives modulo results (as shown by arrows 555 and 556) and uses modulo value 2 to calculate an index 580 to the action table identified by the action table pointer 535. As shown, the 3$^{rd}$ entry 585 in the action table 495 is selected to get the identification (e.g., the next hop address) for the selected path.

Figure 6:
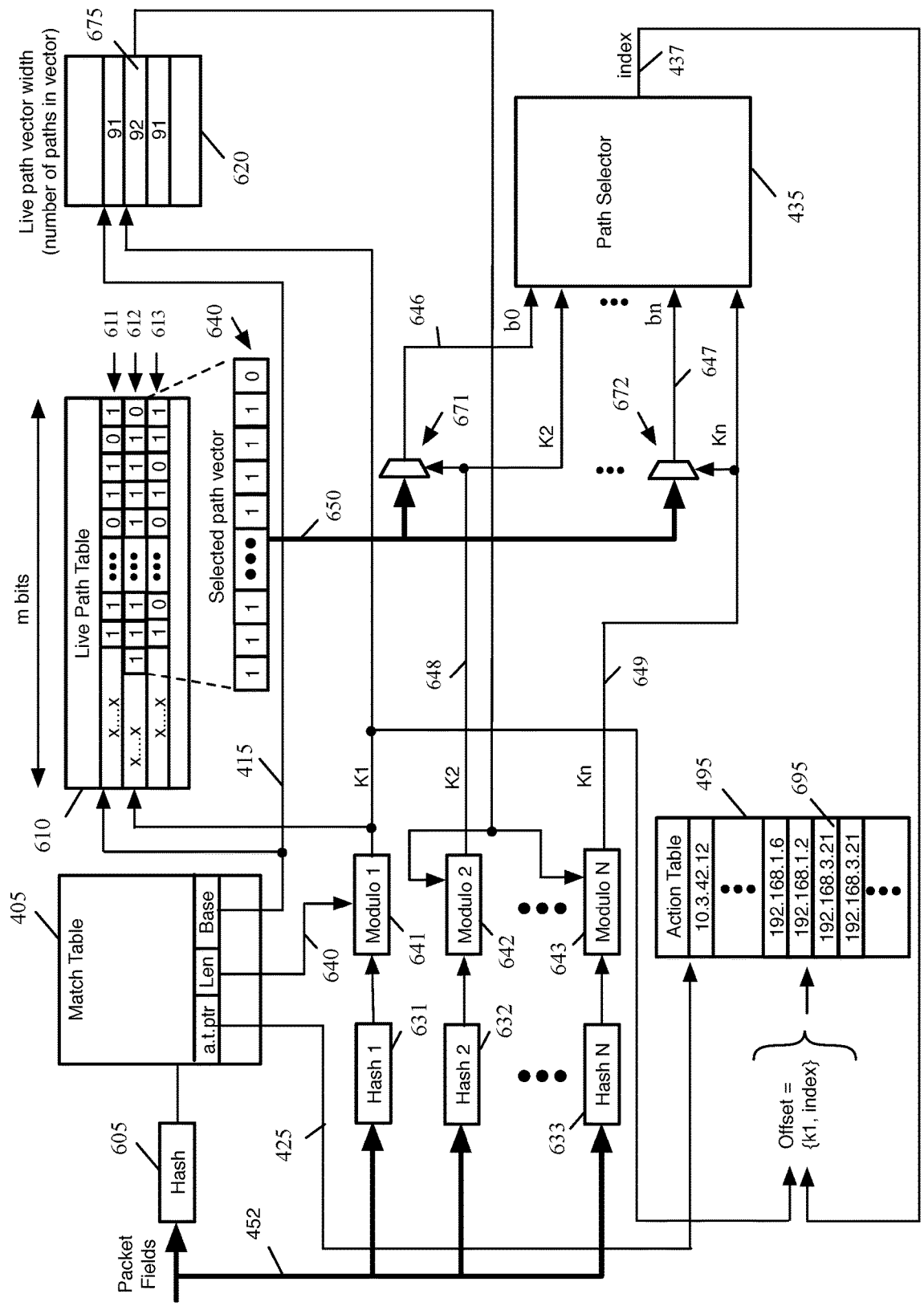
FIG. 6 conceptually illustrates a block diagram of an implementation of the system of FIG. 4 in some embodiments.

FIG. 6 conceptually illustrates a block diagram of an implementation of the system of FIG. 4 in some embodiments. As shown, a set of one or more packet header fields (e.g., L3 destination address of the packet) is used to identify the information for a path group in the match table 405. In this embodiment, the content of packet header field is hashed (as shown by hash function 605) in order to quickly find an entry in the match table. Some embodiments utilize methods other than hashing to find an entry in the match table.

Match table 405 returns a pointer 425 (abbreviated as a.t.ptr in the figure) to the action table 495 where the identification of the paths for the identified path group is stored. The action table, for example, stores the next hop address of each path.

The match table also returns an offset (or pointer) 415, referred to as base, that identifies where the sequence of status bits for the path group starts in the live path table 610. In the example of FIG. 6, each word (or vector) in live path table 610 is m bits (e.g., 128 bits). It should be understood that other word sizes for the table are also possible. Since the number of paths in a path group may be much larger than the number of bits in a word, some path groups may require the use of more than one word in the table. In this example, a word has 128 bits and there are 273 configured paths in the path group. The path group, therefore requires 3 words (or vectors) 611-613 in the live path table 410.

In order to balance the number of paths in each vector, some embodiments divide the total number of paths in a path group into equal or near equal numbers in the path group's vectors. For instance, in the example of FIG. 6, each of vectors 611 and 613 have 91 entries and vector 612 has 92 entries. Each status bit of 1 indicates that the corresponding path is up (i.e. the path is live and operational). A status bit of 0 indicates that the path is configured but is down. The rest of each vector (as shown by x's to signify a don't care value) is not used. The number of the configured paths in each vector is stored in the live path vector width table 620.

Since the embodiment of FIG. 6 allows more than one vector for a path group, hash function 631 is used to identify a vector from the possible several vector of the path group. Hash function 631 generates a hash value from the packet field 452 (e.g., the n tuple 511-515 shown in FIG. 5) and generate a hash value. Modulo function 641 receives the hash value from hash function 631 and the number 640 of path group's vectors abbreviated as Len in the figure) from the match table 405 and computes an offset from the base of the path group's status bits vectors.

In this example, modulo function 641 has generated an offset of 1 (shown as K1 in the figure), which identifies the second vector 612 of the path group as the vector to search for an active path. This vector is visually identified in the expanded view 640 to conceptually emphasize that hash function 631 and modulo function 641 are used to identify one of the vectors of the path group as the vector to search for an active path.

Path selector 435 receives the identified status bit vector 612 as input (as shown by line 550). Multiplexers 671-672 also receive the selected status bit vector as input. Hash functions 632-633 are a group of hash functions (two are shown in this example) that receive the packet header fields 452 and compute hash values. Each hash function 632-633 uses a different algorithm in order to generate different hash values from the same set of inputs 452. The hash functions 632-633 have a similar function as hash functions 481-483 in FIG. 4. Since FIG. 4 illustrated an abstract block diagram of the system, the figure did not show that status bits maybe broken in several vectors and therefore did not include a hash function similar to hash function 631 to identify one of the vectors to search for a path.

Each modulo function 642-643 receives the output of the corresponding hash function and calculates the modulo of the hash value over the number of configured paths in the path vector that is being searched for an active path. In this example, the number of configured path in the vector 612 is 92 as shown in the entry 675 in live path vector width table 620.

Each modulo function 642-643 calculates an offset to status bit vector 612 to select one of the status bits. Each multiplexer 671-672 receives the output of the corresponding modulo function 642-643 (shown as K2-Kn in the figure) as the multiplexer selector input. As a result, each multiplexer selects one of the status bits and provides the value of the status bit (0 or 1) at the multiplexer's output (as shown by 646-467). Path selector receives these status bit values as well as the offsets K2-Kn (as shown by 648-469) and selects a path based on a priority scheme.

For instance, the path selector may give the highest priority to the status bit identified by hash function 632 and modulo function 642. If this status bit is 1, the offset of the status bit is used (as shown by 437) as an index into action table 495 to identify the corresponding path. If the status bit is 0, the bit value of the status bit identified by the next hash function/modulo function pair is examined. If that status bit is 1, the corresponding offset of the status bit in the vector is used as offset to the action table. If all status bits identified by modulo function 642-463 are 0, the deterministic fall back technique descried in the next section is used to identify an operational path.

The action table pointer 425 identifies the beginning of the path identifiers for path group identified by the match table 405. The offset 437 from the path selector is used in combination with the action table pointer (as shown by 425) to find the identification (e.g., the next hop address) 695 of the selected path. Once a path is identified, the path is used to forward the current packet to its destination.

Figures 7, 8:
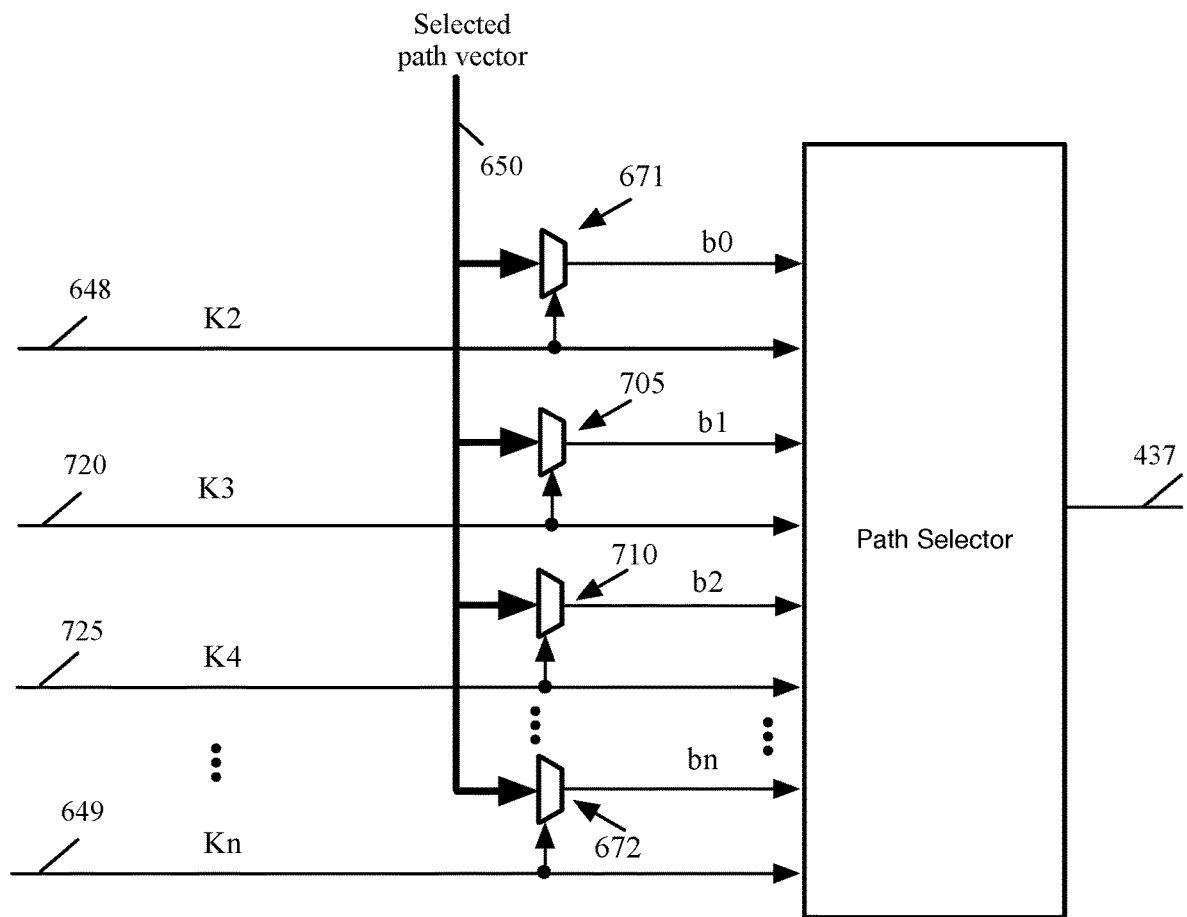
FIG. 7 conceptually illustrates a portion of the system of FIG. 6 of some embodiments in further details.
FIG. 8 conceptually illustrates logic implemented by the path selector to prioritize selection of a path for forwarding a packet in some embodiments.

FIG. 6 only shows two multiplexers for simplicity. FIGS. 7 and 8 illustrate further details of the operation of the multiplexers and the path selector in some embodiments. FIG. 7 conceptually illustrates a portion of the system of FIG. 6 of some embodiments in further details. As shown, several multiplexers 671, 705, 710, 672, etc., receive the selected path vector 650 (e.g., as 128 bit input).

Each multiplexer also receives the output of one of the modulo functions (e.g., modulo functions 641, 643, and several other modulo functions that were not shown in FIG. 6 for simplicity) at the multiplexer input (e.g., as a 7 bit value to identify one of the 128 possible paths in a path vector). The output of these modulo functions are shown as K2, K3, K4, Kn, etc., in FIG. 7.

Each multiplexer 671, 705, 710, 672 selects the status bit identified by the corresponding modulo function and outputs the value of the status bit (e.g., a 1 bit value of 0 or 1). Path selector 435 also receives the output of each modulo function K2-Kn. The path selector receives the output of each multiplexer and the corresponding offset K2-Kn as a pair of related inputs.

The path selector implements a logic such as the logic conceptually shown in FIG. 8. As shown, the highest priority is given to the status bit identified by the output 648 of modulo function 642. The value of this status bit (shown as b0 in FIGS. 6-8) is the output of multiplexer 671. When this status bit is 1 (as shown by 805), no matter what the value of other status bits are, the path corresponding to this status bit (i.e., the path identified by K2) is used to forward the packet. This is shown with value of don't care, "X", for the value of all other status bits.

When b0 is 0, the next priority is given to the output of the next multiplexer (multiplexer 705 in FIG. 7). The output of this multiplexer is shown as b1. As shown by 810 in FIG. 8, when b0 is 0 and b1 is 1, not matter what the value of other status bits are, path selector outputs K3 as the offset to the action table. Similarly when b0 and b1 are both 0, the next priority is given to b2 (as shown by 815). The last priority is given to status bit identified by modulo function 643 (as shown by 820). When all other identified status bits are 0 and bn is 1, path finder outputs Kn as the offset to action table. If none of the identified status bits are 1, the deterministic fallback approach described in the next section is used to identify a path.

B. Deterministic Technique to Redistribute Flows from Failed Paths without Redistributing Packet Flows from Operational Paths Some embodiments implement a deterministic method to identify a path to redistributes flows from a failed path. In some embodiments, this method is implemented by hardware and firmware in the data plane of a forwarding element.

Figure 9:
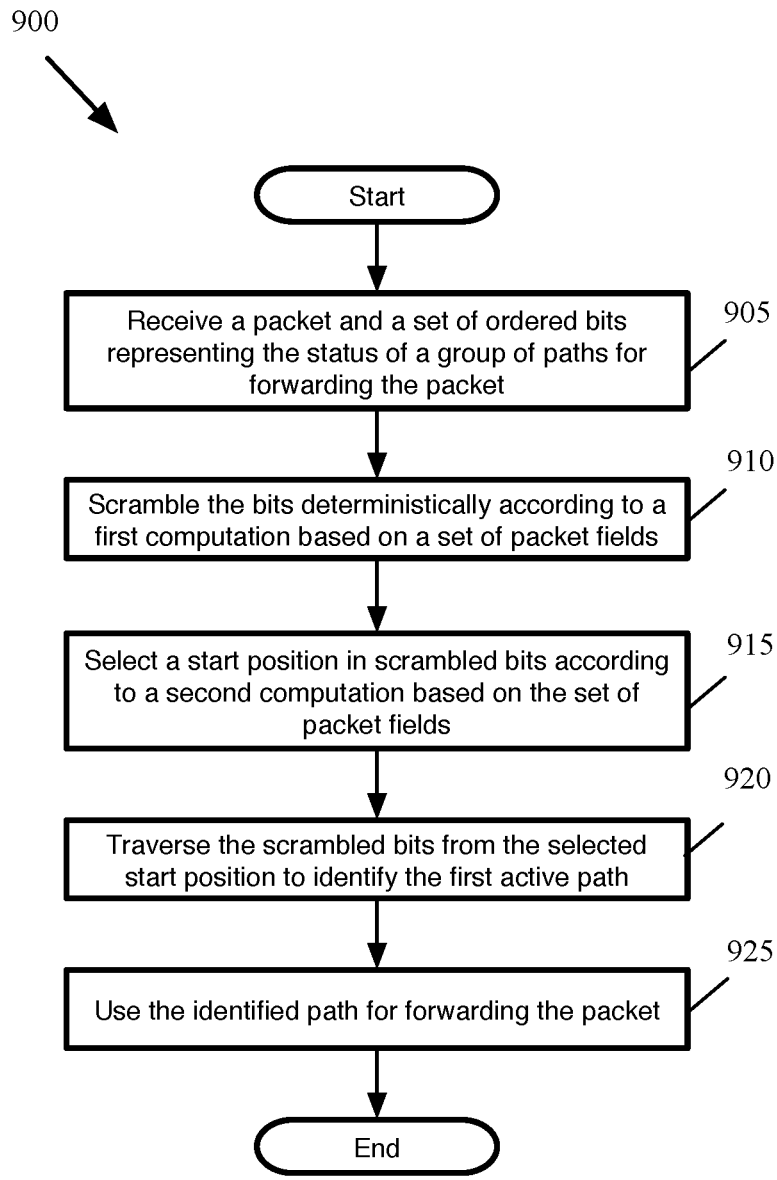
FIG. 9 conceptually illustrates a process for deterministically identifying a path to redirect flows from a failed path in some embodiments.

FIG. 9 conceptually illustrates a process 900 for deterministically identifying a path to redirect flows from a failed path in some embodiments. Process 900 is described by reference to FIGS. 10-12 that conceptually show different examples of how the process of FIG. 9 identifies a path.

Process 900 in some embodiments is performed when resilient hashing cannot identify an operational path for forwarding a packet as described above by reference to operation 340 in FIG. 3. The process in some embodiments is implemented by hardware and firmware in the data plane of a forwarding element.

As shown, the process receives (at 905) a packet and a set of ordered bits that represent the status of a group of paths for forwarding the packet. For instance, the process receives packet 490 and status bits 430 shown in FIG. 4. In some embodiments, the set of ordered bits is identified by a process such as a resilient hashing technique described above.

Figure 10:
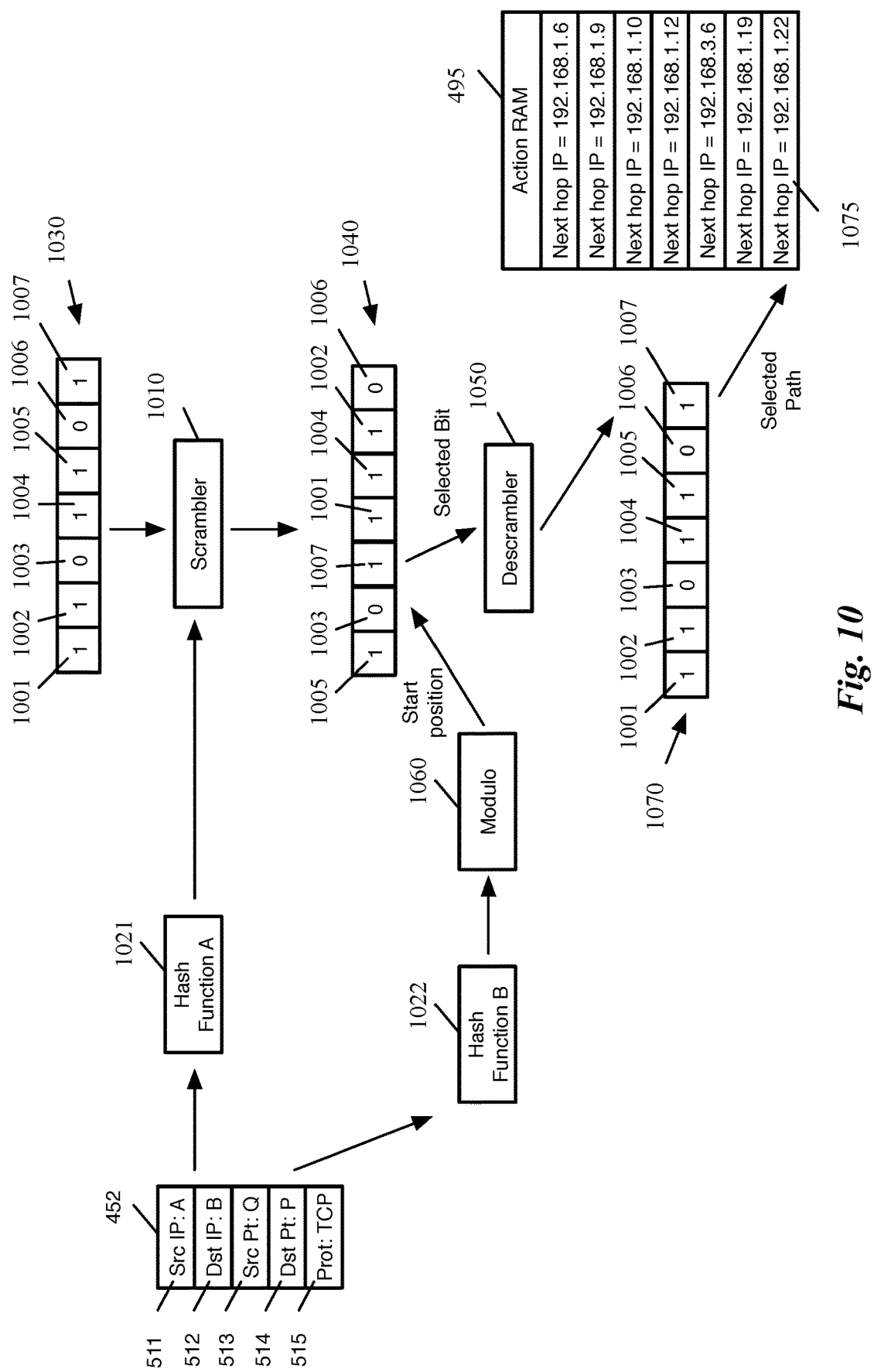
FIG. 10 conceptually illustrates an example where a hash value is computed on a set of fields on a packet header in some embodiments.

The process then scrambles (at 910) the bits deterministically according to a first computation based on a set of packet fields. As shown in FIG. 10, a hash value using hash function A 1021 is computed on a set of fields 452 on a packet header. The set of fields 452 in some embodiments uniquely identifies a packet flow. For instance, similar to the set of fields 452 in FIG. 5, the set of fields 452 in FIG. 10 is an n tuple that includes L3 source address 511 and L3 destination address 512 (e.g., IP source and IP destination addresses), L4 source port 513 and L4 destination port 514 (e.g., TCP or UDP source and destination ports), and L4 protocol 515 used (e.g., TCP or UDP).

The hash value is used by a scrambler 1010 to scramble the set of status bits 1030. The set of status bits 1030 is similar to the set of status bits 430 in FIG. 4 and the set of status bits 530 in FIG. 5. Each bit in the set of status bits 1030 corresponds to a path in the path group that is used to forward packets from the forwarding element to the packet destination.

As shown, scrambler 1010 scrambles the order of status bits 1030 into a scrambled set of status bits 1040. In the example of FIG. 10, the unscrambled sequence of status bits, which was (1001, 1002, 1003, 1004, 1005, 1006, 1007), is scrambled into the new sequence of (1005, 1003, 1007, 1001, 1004, 1002, 1006).

Referring back to FIG. 9, the process selects (at 915) a start position in the set of scrambled status bits according to a second computation based on the set of packet fields. As shown in FIG. 10, hash function B 1022 computes a hash value from n tuple 511-515. Hash function B 1022 in some embodiments utilizes a different hash algorithm than hash function A 1022. The hash value computed by hash function B 1022 is used as an index (or pointer) to identify one of the scrambled status bits as a start position to identify an operational path.

For instance, the hash value modulo the number of status bits is computed to identify a start position in the sequence of status bits. In the example of FIG. 10, there are 7 status bits and the modulo computation 1060 results in a value between 0 to 6 which is used to identify one of the 7 bits as the start position. As shown, scrambled bit labeled 1003 is identified as the start position in this example.

Referring back to FIG. 9, the process then traverses (at 920) the scrambled bits from the selected start position to identify the first active path that is encountered during the traverse. As shown in FIG. 10, the scrambled bit sequence is traversed starting from bit 1003. Since bit 1003 is 0, the path corresponding to this status bit is down and cannot be used for forwarding packets. Assuming that the bit sequence is traversed from left to right, the next bit in the sequence is bit 1007. Since this bit is 1, the corresponding path is up and can be as the path for forwarding the packet.

As shown, the descrambler 1050 descrambles the scrambled status bits 1040 back to the unscrambled sequence 1070 (which has the same sequence as 1030). The unscrambled offset of status bit 1007 in this example is 6, which is used to identify the 7th path (at offset 6) in the action table 495 as the selected path. The identification 1075 of the selected path (e.g., the next hop address of the path) is used to forward the packet.

Referring back to FIG. 9, the process then uses (at 925) the identified path for forwarding the packet. For instance, the process uses the address 1075 from action table 495 to forward the packet. The process then ends.

Figure 11:
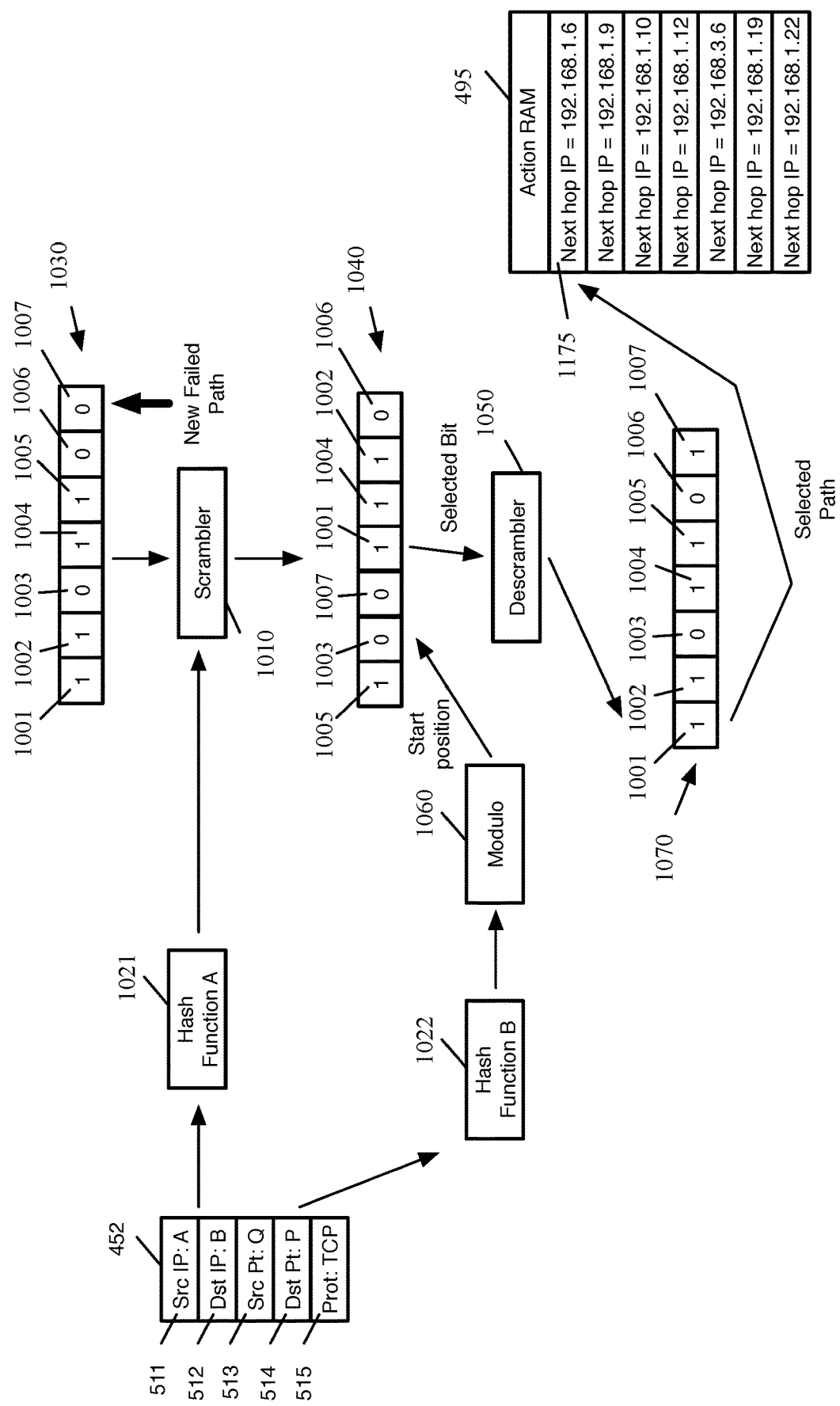
FIG. 11 illustrates the example of FIG. 10 after another path fails and a packet from the same flow arrives.

FIG. 11 illustrates the example of FIG. 10 after another path fails and a packet from the same flow as the flow of FIG. 10 arrives. As shown, the path corresponding to status bit 1007 has failed and the status bit is set to 0. When another packet arrives, the n tuple 511-515 of the packet is hashed and the hash value is sent to scrambler 1010 to scramble the sequence of status bits 1030.

Since the packet is from the same flow as the packet of FIG. 10, the n tuple 511-515 has the same value as then tuple 511-515 in FIG. 10 and the hash function A 1021 computes the same as the hash value. As a result, the scrambled sequence (1005, 1003, 1007, 1001, 1004, 1002, 1006) 1040 is the same as the sequence in FIG. 10.

Similarly, hash function B 1022 generates the same value as hash function B in FIG. 10. Since the number of configured paths has not changed, modulo function 1060 identifies the start point (i.e., scrambled status bit 1003) as the start point as in the example of FIG. 10.

As shown in FIG. 11, the scrambled bit sequence is traversed starting from bit 1003. Since bit 1003 is 0, the path corresponding to this status bit is down and cannot be used for forwarding packets. The next bit in the sequence is bit 1007. Since this bit is also 0, the corresponding path is also down and cannot be used for forwarding packets.

Traversing of the sequence is continued and the next scrambled status bit is status bit 1001. Since this bit is 1, the corresponding path is up and can be as the path for forwarding the packet.

As shown, the descrambler 1050 descrambles the scrambled status bits 1040 back to the unscrambled sequence 1070. The unscrambled offset of status bit 1001 in this example is 0, which is used to identify the 1st path (at offset 0) in the action table 495 as the selected path. The identification 1175 of the selected path (e.g., the next hop address of the path) is then used to forward the packet.

Figure 12:
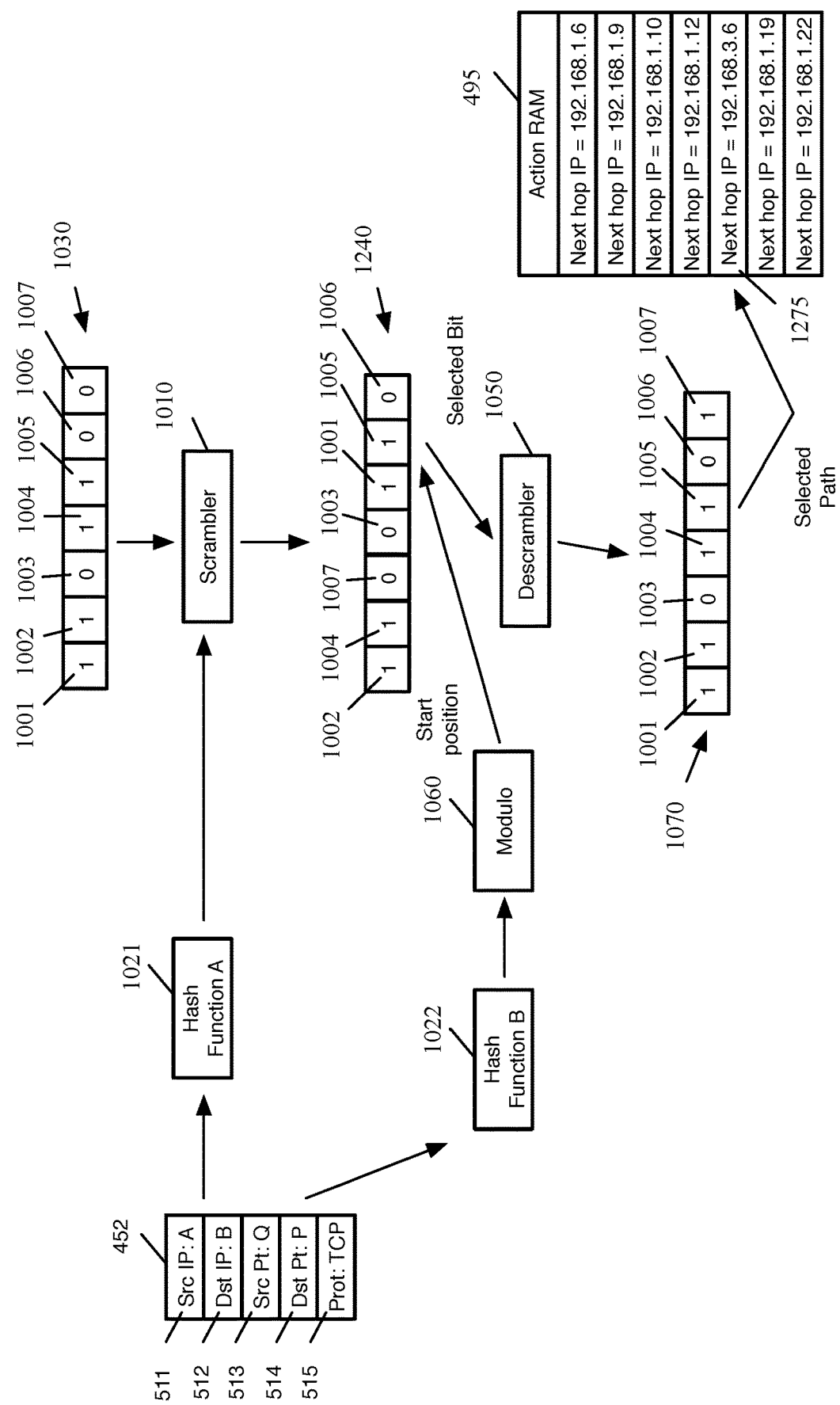
FIG. 12 illustrates the example of FIG. 11 after a packet from a different flow arrives.

FIG. 12 illustrates the example of FIG. 11 after a packet from a different flow arrives. Since the packet in this example is from a different flow, the n tuple 511-515 of the packet will have a different value than the n tuple 511-515 in FIGS. 10 and 11. As a result, the hash function A generates a different hash value and the scrambler 1050 scrambles the status bits differently. The scrambled sequence (1002, 1004, 1007, 1003, 1001, 1005, 1006) 1240 is different than the sequence 1040 in FIGS. 10 and 11.

Similarly, hash function B 1022 generates a different hash value and modulo function 1060 identifies a different status bit 1005 as the start point than the example of FIG. 10. The scrambled bit sequence is traversed starting from bit 1005. Since bit 1005 is 1, the path corresponding to this status bit is up and can be as the path for forwarding the packet.

As shown, the descrambler 1050 descrambles the scrambled status bits 1240 back to the unscrambled sequence 1070. The unscrambled offset of status bit 1005 in this example is 4, which is used to identify the $5^{th}$ path (at offset 4) in the action table 495 as the selected path. The identification 1275 of the selected path (e.g., the next hop address of the path) is then used to forward the packet.

C. Using Data Plane Operations to Redistribute Packets Flows from Failed Paths

In some embodiments, determining an alternative path and redistribution of packet flows from failed paths are performed in the data plane of a forwarding element using hardware and firmware without using control plane operations, management plane operations, or software. The data plane operations performed by these embodiments are described below.

Figure 13:
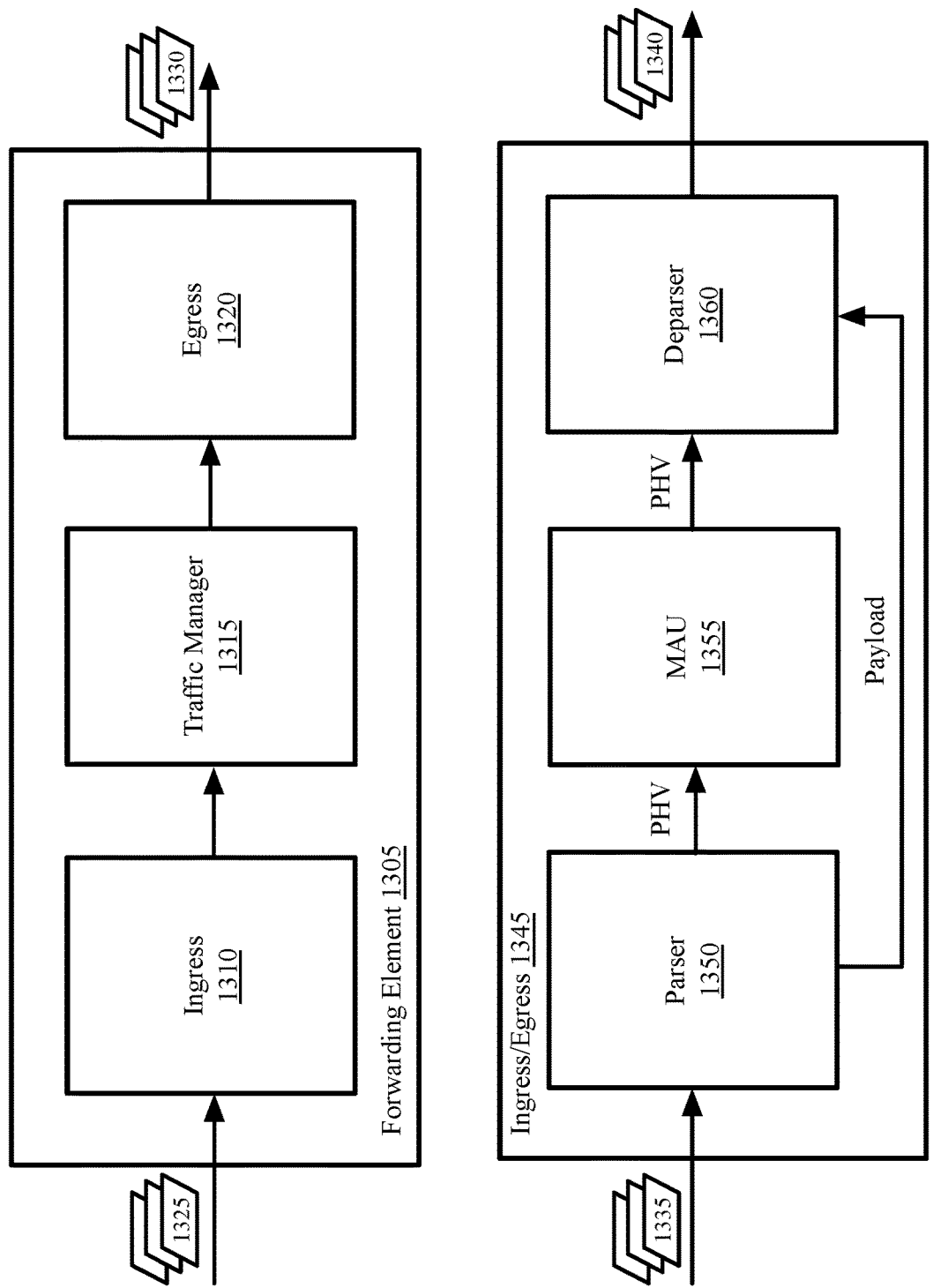
FIG. 13 conceptually illustrates a block diagram of a hardware forwarding element and a block diagram of an ingress or egress pipeline of the hardware forwarding element in some embodiments.

FIG. 13 conceptually illustrates a block diagram of a hardware forwarding element 1305 and a block diagram of an ingress or egress pipeline 1345 of the hardware forwarding element in some embodiments. As shown, the forwarding element 1305 includes an ingress pipeline (or data path) 1310, a traffic manager 1315, and an egress pipeline 1320.

The traffic manager 1315 has several components such as a queuing and buffering system, a packet replicator, and a port failure feedback generator. These components are described further below. The ingress pipeline 1310 receives packets 1325 from a set of channels (e.g., through a set of I/O modules), parses each packet header into a packet header vector (PHV), sends the PHV through a set of match and action stages which may modify the PHV, deparses the packet headers back from the PHV into packet format, and queues the packet in a centralized data buffer (i.e., a data buffer provided by the traffic manager 1315). Each one of these operations is described in more detail below by reference to the pipeline 1345. The block diagram of both the ingress pipeline 1310 and the egress pipeline 1320 is similar to the pipeline 1345.

In some embodiments, the traffic manager 1315 receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 1315 into the egress pipeline 1320.

The egress pipeline 1320 receives the packets from the traffic manager 1315. The parser in egress pipeline separates the packet payload from the packet headers, stores the packets headers in a PHV, sends the PHV through a set of match and action stages, deparses the packet headers back from the PHV into packet format, and sends the packets 1330 to an appropriate output port of the forwarding element 1305 to be driven off the forwarding element (e.g., through one of the output channels). An output packet may be the same packet as the corresponding input packet (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 1305 are exemplary only. The ingress, traffic manager, and egress blocks are simplified for ease of description. For example, although the figure shows only one entry point to the ingress parser and one exit point from the egress deparser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 1345, some embodiments employ numerous parser blocks (e.g., 16 parser blocks) that feed a match-action unit (MAU) in each pipeline.

FIG. 13 also shows a block diagram 1345 of an interface of the hardware forwarding element 1305. Each one of the ingress 1310 and egress 1320 pipelines use an interface similar to the interface 1345. The interface includes a pipeline with three different units, namely a parser unit 1350, an MAU 1355, and a deparser unit 1360. The parser 1350 of some embodiments receives the incoming packets and produces a packet header vector (PHV) as its output. In other words, the parser 1350 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 1350 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV provides the input data to the match tables of the MAU. In some embodiments the MAU 1355 includes a set of match-action stages (e.g., 32 match-action stages). Each of these stages matches a particular set of header fields against a match table and takes an action based on the result of the match. For instance, the match stage identifies a packet's flow based on the content of a set of the packet's header fields. The corresponding action stage performs operations such as performing resilient hashing or the alternative deterministic approach to find a path for forward the packet. In some embodiments, several match-action units in the MAU perform different operations on a packet as the packet goes through the match-action pipeline. Examples of other operations performed on a packet include assigning the packet to an output port and queue, dropping the packet, modifying one or more of the header fields, etc.

In some embodiments, the forwarding element includes a set of unit memories (e.g., SRAM and/or ternary content-addressable memory (TCAM)). The unit memories implement a match-action table by having a first set of the unit memories store the match entries and a second set of the unit memories store the action entries. That is, for a particular match entry and the corresponding action entry, the match entry is stored in a first unit memory and the action entry is stored in a second unit memory.

Some embodiments arrange the unit memories in a grid of rows and columns, with horizontal and vertical routing resources that connects the unit memories to arithmetic logic units (ALUs), also referred to as action units, that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, ternary indirection, etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments includes two portions: the set of match conditions for a packet to meet, and an address of the action entry to read when the set of match conditions is met by a packet. The address, in some embodiments, specifies both a memory page that indicates a unit memory within the grid of unit memories, and a location within that memory page.

Based on the actions taken on different header data during the different stages of the MAU 1355, the PHV that the MAU outputs might include the same header data as the PHV that the MAU received from the parser, or the output PHV might contain different data than the input PHV.

The output PHV is then handed to the deparser 1360. The deparser 1360 reassembles the packet by putting back together the output PHV (that might or might not have been modified) that the deparser receives from the MAU 1355 and the payload of the packet that the deparser receives directly from the parser 1350. The deparser then sends the packets 1340 out of the ingress/egress pipeline (to the traffic manager 1315 or out of the forwarding element, depending on whether it is the deparser for the ingress pipeline or the egress pipeline).

II. Computer System

Figure 14:
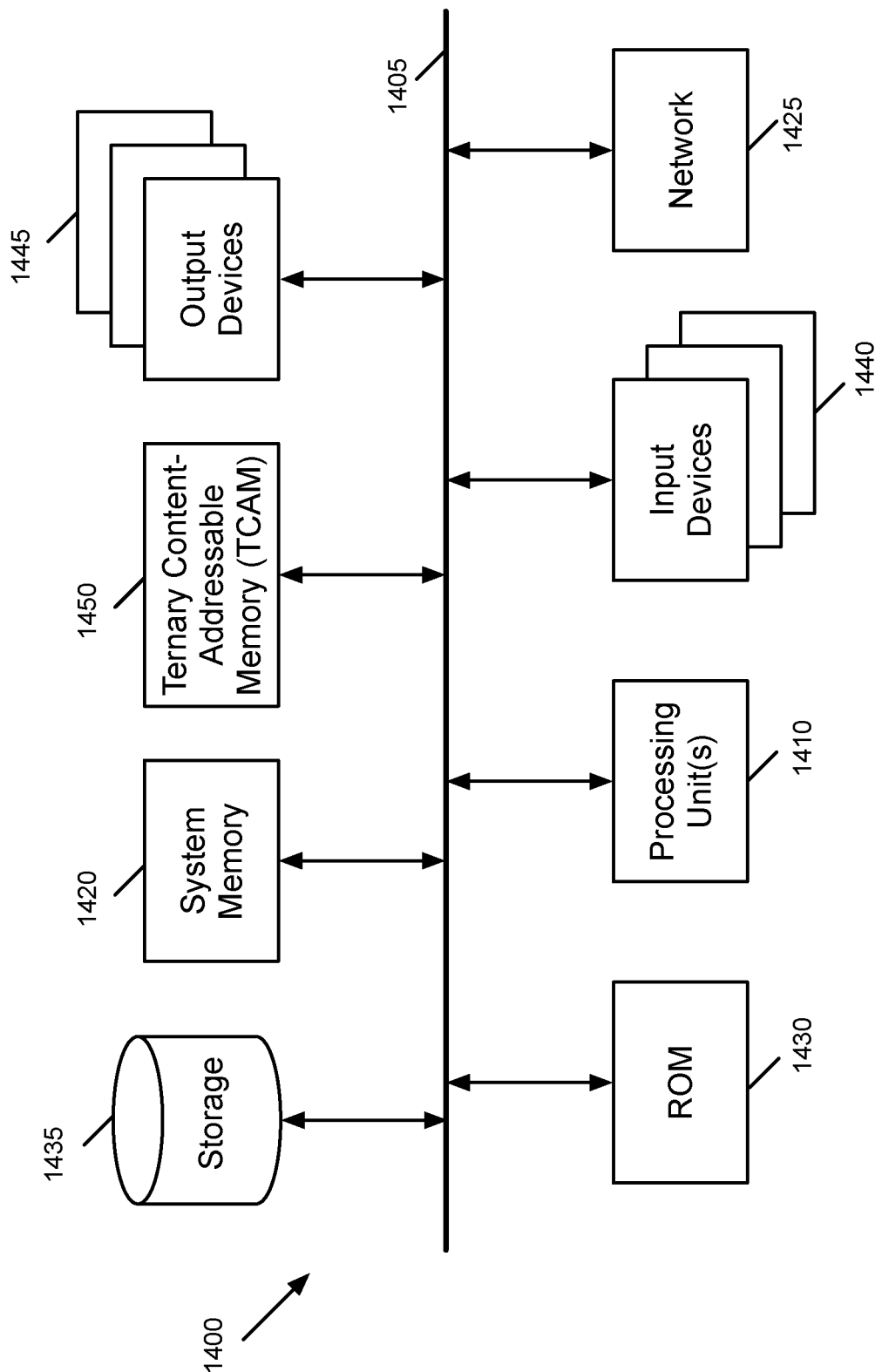
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, system memory 1420, read-only memory (ROM) 1430, permanent storage device 1435, input devices 1440, output devices 1445, and TCAM 1450.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. For a data plane of a hardware forwarding element, a method for identifying an egress path for a packet received by the data plane, the method comprising:
   identifying a plurality of possible egress paths for the packet, wherein the identified egress paths have a priority order;
   identifying an operational status of each of the identified paths;
   using the operational status and priority order to select an identified path as the egress path for the packet; and
   based on failure of the selected egress path, redistributing one or more packet flows assigned to a failed selected egress path without redistributing packet flows assigned to operational paths;
   wherein:
     the identified paths are to be identified via different hash values that are to be calculated using different hash algorithms based upon header fields of the packet;
     the header fields identify a flow;
     a highest priority order operational path of the identified paths is to be selected for use in egress of the packet; and
     in event that none of the identified paths is operational, another egress path is deterministically selected from the plurality of possible egress paths based upon a path selection sequence order that is determined based upon at least one computation involving the header fields.

2. The method of claim 1, wherein using the operational status and priority order to select an identified path as the egress path for the packet comprises:
   when the highest priority path is not operational, selecting a next highest priority operational path.

3. The method of claim 1, wherein the data plane comprises one or more match-action stages and comprising:
   use one or more match-action stages of the data plane to match a particular set of header fields of the packet against a match table and perform an action to find one the egress paths to use to forward the packet.

4. The method of claim 1, wherein identifying a plurality of possible egress paths for the packet comprises identifying (i) a number of paths in the plurality of possible egress paths and (ii) a pointer to a start of a sequence of status bits, wherein each status bit identifies a status of a different one of the paths in the plurality of possible egress paths.

5. The method of claim 1, wherein identifying a plurality of possible egress paths for the packet comprises computing the hash value modulo the number of egress paths in the plurality of possible egress paths to determine an offset that corresponds to the egress path for the hash value.

6. The method of claim 5, wherein the identifying an operational status of each of the identified paths comprises, for each of the identified paths, using the offset to identify a status bit for the egress path from a sequence of status bits, wherein a value of the identified status bit specifies whether the egress path is operational or not operational.

7. The method of claim 1, wherein identifying a plurality of possible egress paths for the packet comprises identifying a pointer to a table storing an identification of each path of the plurality of possible egress paths and further comprising determining identification information for the selected path from the table storing the identification of each of path of the plurality of possible egress paths, wherein the identification information for the selected path comprises a next hop address.

8. A hardware forwarding element comprising:
   a control plane; and
   a data plane that receives packets and identifies egress paths for the received packets, the data plane configured to, without invoking the control plane:
     identify a plurality of possible egress paths for the packet, wherein the identified egress paths have a priority order;
     identify an operational status of each of the identified paths;
     use the operational status and priority order to select an identified path as the egress path for the packet; and
     based on failure of the selected egress path, redistribute one or more packet flows assigned to a failed selected egress path without redistributing packet flows assigned to operational paths;
   wherein:
     the identified paths are to be identified via different hash values that are to be calculated using different hash algorithms based upon header fields of the packet;
     the header fields identify a flow;
     a highest priority order operational path of the identified paths is to be selected for use in egress of the packet; and
     in event that none of the identified paths is operational, another egress path is deterministically selected from the plurality of possible egress paths based upon a path selection sequence order that is determined based upon at least one computation involving the header fields.

9. The hardware forwarding element of claim 8, wherein to use the operational status and priority order to select an identified path as the egress path for the packet, the data plane is to:
   when the highest priority path is not operational, select a next highest priority operational path.

10. The hardware forwarding element of claim 8, wherein the data plane comprises one or more match-action stages and wherein to use the operational status and priority order to select an identified path as the egress path for the packet, the data plane is to:
    use the one or more match-action stages to match a particular set of header fields of the packet against a match table and perform an action to find one the egress paths to use to forward the packet.

11. The hardware forwarding element of claim 8, wherein to identify a plurality of possible egress paths for the packet, the data plane is to identify (i) a number of paths in the plurality of possible egress paths and (ii) a pointer to a start of a sequence of status bits, wherein each status bit identifies a status of a different one of the paths in the plurality of possible egress paths.

12. The hardware forwarding element of claim 8, wherein to identify a plurality of possible egress paths for the packet, the data plane is to compute the hash value modulo the number of egress paths in the plurality of possible egress paths to determine an offset that corresponds to the egress path for the hash value.

13. The hardware forwarding element of claim 12, wherein to identify an operational status of each of the identified paths comprises, for each of the identified paths, use of the offset to identify a status bit for the egress path from a sequence of status bits, wherein a value of the identified status bit specifies whether the egress path is operational or not operational.

14. The hardware forwarding element of claim 8, wherein to identify a plurality of possible egress paths for the packet, wherein the identified egress paths have a priority order, the data plane is to identify a pointer to a table storing an identification of each path of the plurality of possible egress paths and determine identification information for the selected path from the table storing the identification of each of path of the plurality of possible egress paths, wherein the identification information for the selected path comprises a next hop address.

15. At least one computer-readable medium, comprising instructions stored therein, that when executed by a data plane of a forwarding element, result in the data plane being configured to perform operations comprising:
    identify a plurality of possible egress paths for a received packet, wherein the identified egress paths have a priority order;
    identify an operational status of each of the identified egress paths;
    use the operational status and priority order to select an identified path as the egress path for the packet; and
    based on failure of the selected egress path, redistribute one or more packet flows assigned to the failed selected egress path without redistributing packet flows assigned to operational paths;

wherein:
    the identified paths are to be identified via different hash values that are to be calculated using different hash algorithms based upon header fields of the packet;
    the header fields identify a flow;
    a highest priority order operational path of the identified paths is to be selected for use in egress of the packet; and
    in event that none of the identified paths is operational, another egress path is deterministically selected from the plurality of possible egress paths based upon a path selection sequence order that is determined based upon at least one computation involving the header fields.

16. The at least one computer-readable medium of claim 15, wherein the data plane comprises one or more match-action stages and wherein to use the operational status and priority order to select an identified path as the egress path for the packet, the data plane is to:
    use the one or more match-action stages to match a particular set of header fields of the packet against a match table and perform an action to find one the egress paths to use to forward the packet.

* * * * *